US000001126H

United States Statutory Invention Registration [19]

[11] Reg. Number: H1126

Pan et al. [43] Published: Jan. 5, 1993

[54] TREATMENT OF SODIUM NITRITE-CONTAINING BOILER WASTEWATER

[75] Inventors: Bingham Y. K. Pan; Henry P. Sheng, both of Claremont, Calif.

[73] Assignee: The United States of America as represented by the Secretary of the Navy, Washington, D.C.

[21] Appl. No.: 790,850

[22] Filed: Nov. 12, 1991

[51] Int. Cl.[5] ..... C02F 1/52; C02F 1/68

[52] U.S. Cl. ..... 210/718; 210/719; 210/750; 210/757; 210/903; 210/912

[58] Field of Search ..... 210/903, 718, 719, 750, 210/757, 912

[56] References Cited

U.S. PATENT DOCUMENTS

| | | | |
|---|---|---|---|
| 3,617,579 | 11/1971 | Gunderloy, Jr. | 210/903 |
| 3,709,364 | 1/1973 | Savage | 210/903 |
| 3,862,296 | 1/1975 | Dotson et al. | 210/903 |
| 3,962,114 | 6/1976 | Berreth | 210/903 |
| 4,990,266 | 2/1991 | Vorlop et al. | 210/748 |

FOREIGN PATENT DOCUMENTS

| | | |
|---|---|---|
| 3506825 | 8/1986 | Fed. Rep. of Germany . |

*Primary Examiner*—Peter A. Nelson
*Attorney, Agent, or Firm*—Melvin J. Sliwka; David S. Kalmbaugh

[57] ABSTRACT

An integrated process for treatment of wastewater from steam boiler cleaning operations, containing sodium nitrite and also usually heavy metal ions such as Cu, Fe, Pb, Cr, Cd, Zn and Ni, as well as suspended solids and sludge, to remove the nitrite, substantially reduce the amount of such metal ions and remove suspended solids and sludge in the treated wastewater. The process comprises adding sulfamic acid to the wastewater, particularly in about stoichiometric proportions with respect to sodium nitrite to form gaseous nitrogen. The reaction takes place at ambient temperature and atmospheric pressure. An alkali such as sodium hydroxide is added to the resulting solution in amount sufficient to raise the pH thereof to about 10, and precipitating the metal ions. The precipitates and suspended solids and sludge are removed from the resulting wastewater by settling and filtration, and the wastewater free of nitrite and of substantially reduced metal ion content and free of suspended solids as well as sludge, is in condition for discharge to sewers.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TREATMENT OF SODIUM NITRITE-CONTAINING BOILER WASTEWATER

BACKGROUND OF THE INVENTION

This invention relates to treatment and disposal of sodium nitrite-containing wastewater generated from ship steam boiler maintenance operations, and is particularly concerned with the destruction of the hazardous sodium nitrite in such wastewater, as well as the treatment of toxic heavy metal ions, removal of environmentally objectionable suspended solids, and disposal of sludge also present in such wastewater.

One of the regular maintenance tasks for the Navy's surface ships is cleaning of steam boilers. Wastewater is generated during cleaning of the steam boiler tubes by hydroblast washing. There are two other steam boiler mainteance operations that generate wastewater, namely, (1) hydrostatic tests to check for leaks in boilers before hydroblast washing and (2) boiler lay-up after hydroblast washing and before boiler light off. The water solution used in these operations contains sodium nitrite, a corrosion inhibitor. Thus, the combined wastewater from the above steam boiler cleaning operations is sodium nitrite-containing wastewater. Since the sodium nitrite is not measurably consumed or chemically altered in these cleaning operations, the average nitrite concentration in the wastewater is virtually the same as that in the virgin cleaning solution. The average concentration of sodium nitrite in such wastewater is about 1200 mg/l. However, concentrations of sodium nitrite in the wastewater from the above cleaning operations can be substantially higher, e.g. 1400 mg/l.

Such wastewater is therefore high in sodium nitrite, and also contains suspended solids, sludge, and toxic heavy metal ions. Since the sodium nitrite is the main pollutant of concern, this wastewater is termed "sodium nitrite wastewater".

Although there are no Federal discharge limits to regulate this wastewater, many states have classified such wastewater as hazardous due to the sodium nitrite, heavy metal ions, suspended solids and sludge therein. Some municipal authorities have imposed discharge limits at 33 mg/l for nitrite and 45 mg/l for nitrate. These levels are the same as those in the EPA's drinking water standards. In the case of naval operations, most of the Navy's nitrite wastewater is combined with other wastes at Naval shipyards, with no effective treatment method at hand for the combined wastewater. Disposal is by contract hauling at a high cost per gallon of wastewater. Moreover, the producers of hazardous wastewater, the shipyards, are liable for the safe disposal of such wastewater by contractors.

The main concern with this wastewater is that unmitigated discharge of nitrite, a nutrient, could lead to eutrophication in the receiving waters. Eutrophication results in serious water quality problems, such as taste and odor in water supplies, turbidity, unsightly scums and choking of waterways, and consequently endangers aquatic species such as fish.

Many of the municipal wastewater treatment systems cannot handle high nitrite wastewater, and refuse to accept it.

The use of chemical means to treat nitrite-bearing wastewater is largely presently at the experimental level. In the general literature, for example, few articles are concerned with the chemical treatment of nitrite wastewater, and particularly high nitrite wastewater.

The use of sulfamic acid, $NH_2SO_3H$, for the detoxification of a nitrite-containing wastewater is discussed in German Patent No. 3506825. The patent discloses that nitrite wastewater can be treated with sulfamic acid to generate nitrogen gas and hydrogen sulfate ion. Sulfuric acid, $H_2SO_4$, and also sodium hydroxide, NaOH, were added to adjust the pH during the reaction. The patent discloses the use of concentrations of sulfamic acid with respect to sodium nitrite, such as a proportion of approximately 1 to 1 moles of sulfamic acid per mole of sodium nitrite.

In a related article by Y. M. Kostrikin and O. V. Teterina, "Rate of the Reaction of Nitrites with Sulfamic Acid" Energetik, Vol. 10, 1987, page 22, dosage rates and temperature effects were reported for the sulfamic acid and nitrite reaction. In the article it is noted that at 50° C. it would require an excess dosage of 10 times to achieve a 9% nitrite removal, whereas at 70° C. 2.5 times as much sulfamic acid is required.

One object of the present invention is the removal of sodium nitrite from sodium nitrite wastewater produced from steam boiler maintenance operations.

Another object is to treat the above sodium nitrite wastewater in a manner so as to convert the sodium nitrite into an innocuous form.

Still another object is to convert the sodium nitrite in sodium nitrite wastewater to innocuous forms, and also to remove toxic metal ions and suspended solids from such wastewater, to permit discharge of the treated wastewater to sewers.

Still another particular object is to provide an integrated process to treat the hazardous sodium nitrite wastewater completely for discharging directly to sewers without going through the treatment facilities, such as the Navy's industrial wastewater treatment plant, where heavy metal ions removal and sludge reduction are usually carried out.

SUMMARY OF THE INVENTION

It has been found that sulfamic acid is effective in converting the nitrite in the wastewater from steam boiler cleaning operations, to nitrogen gas. However, contrary to the prior art noted above, stating a need for a large excess dosage of sulfamic acid with respect to sodium nitrite even at elevated temperatures, for complete denitrification, it has been found that only the stoichiometric amount of sulfamic acid with respect to sodium nitrite, that is a molar ratio of sulfamic acid to nitrite of about 1.0:1.0, is necessary, at ambient temperature and at atmospheric pressure, to carry the reaction to completion so as to convert all of the nitrite to nitrogen.

Moreover, it has been found that such substantially complete conversion of the sodium nitrite in the wastewater to nitrogen under the above conditions, particularly without employing a large excess of sulfamic acid, as disclosed in the prior art, can take place in the presence of heavy metal ions such as Cu, Fe, Pb, Cr, Cd, Zn and Ni ions, also generally present in varying amounts in the wastewater, without adversely affecting the nitrite conversion reaction.

After the reaction is completed for converting nitrite ion to nitrogen, an alkali such as NaOH is added to the resulting solution in an amount sufficient to raise the pH of the solution so as to precipitate the metal ions.

Thereafter, the resulting precipitates, suspended solids and sludge in the wastewater can be removed physically therefrom as by settling and filtering.

The resulting treated wastewater substantially free of sodium nitrite, heavy metal ions, suspended solids and sludge is thus rendered non-hazardous and is suitable for discharge to sewers.

The present invention thus provides an integrated process for treatment of wastewater from steam boiler cleaning operations, which consists of destruction of hazardous sodium nitrite, treatment of toxic heavy metal ions, removal of environmentally objectionable suspended solids and reduction or disposal of noxious sludge.

DETAILED DESCRIPTION OF THE INVENTION AND PREFERRED EMBODIMENTS

In carrying out the reaction for denitrification or removal of sodium nitrite present in effluent wastewater from steam boiler cleaning operations, e.g. hydroblasting wastewater, sulfamic acid, e.g. in the form of sulfamic acid crystals, is added slowly to the wastewater in a tank or container. As the acid crystals dissolve, nitrogen is released as minute bubbles effervescing from the solution. The reaction is carried out at ambient temperature and at atmospheric pressure. The reaction is believed to proceed according to the following equation:

$$NaNO_2 + NH_2SO_3H \rightarrow N_2 \uparrow + NaHSO_4 + H_2O$$

It has been found that the above reaction proceeds substantially to completion for conversion of substantially all of the sodium nitrite to nitrogen, employing a proportion of 1 to about 1.4 moles sulfamic acid per mole of sodium nitrite. In preferred practice, only substantially stoichiometric proportions of sulfamic acid with respect to sodium nitrite is employed. By the term "substantially stoichumetric proportions", is meant a molar proportion of sulfamic acid to sodium nitrite of 1:1 to about 1.2:1, so that only a slight excess, if any, of sulfamic acid, need be employed.

The reaction takes place at a pH usually ranging from about 1.5 to 4, resulting from the presence of the sulfamic acid and its conversion to $NaHSO_4$ during the reaction, the pH depending on the amount of sulfamic acid employed. The reaction takes place over a period of time ranging, e.g. from about 30 to about 60 minutes.

After the reaction is completed for conversion of substantially all of the sodium nitrite in the wastewater to nitrogen, alkali, e.g. an alkali metal hydroxide such as sodium hydroxide or an alkaline earth metal hydroxide such as calcium hydroxide can be added to the reaction mixture or resulting solution in an amount sufficient to raise the pH to approximately neutral, to enable the discharge of the treated wastewater into the sewer.

However, hydroblasting wastewater or wastewater from steam boiler cleaning operations generally contains metal particles and/or heavy metal ions, such as Cd, Cr, Cu, Fe, Pb, Zn, Ni ions, most of which are toxic. For substantial removal of such ions, an alkali in the form of an alkali metal hydroxide or an alkaline earth metal hydroxide such as NaOH or $Ca(OH)_2$, or an alkali metal hydride such as $NaBH_4$, can be added to the resulting wastewater in an amount sufficient to raise the pH of the wastewater to between 9 and 10, e.g. about 10. This causes precipitation of the heavy metal ions in the form of their insoluble hydroxides. Such treatment substantially reduces the concentration of these metal ions in the wastewater.

The precipitates from the metal ions, suspended solids and the sludge can be removed from the resulting wastewater by settling and filtration, using a filter press, to result in a small amount of a dense sludge containing 0–50% by volume of solids, which can be disposed of. The lowered heavy metal concentrations, and reduced amounts of suspended solids and sludge in the resulting treated wastewater, as well as the absence of sodium nitrite therein, renders the treated wastewater in compliance with regulations for discharge limits, so as to permit discharge of the treated wastewater directly to sewers.

The following are examples of practice of the invention process:

EXAMPLES 1–7

A number of runs 1 to 7 are made for denitrification of a sodium nitrite wastewater by treatment with sulfamic acid according to the invention.

In each run sulfamic acid crystals are slowly added into the wastewater, resulting in evolution of nitrogen from the solution in the form of small bubbles. During the reaction the pH of the reaction mixture is maintained mainly between about 1.5 and about 2.0. The runs were conducted at room temperature and at atmospheric pressure.

At the end of each run, the final $NO_2$ ion content of each of the resulting wastewater solutions was measured.

In runs 4 to 7 calcium hydroxide is added in an amount sufficient to approximately neutralize the solution at a pH of about 7 or slightly higher The data and results of these runs are set forth in Table 1 below, showing initial $NO_2$ ion concentration of the sodium nitrite wastewater, the amount of sulfamic acid added, the pH of the reaction mixture, the final $NO_2$ ion concentration of the solution in each run and the molar ratio of sulfamic acid to $NO_2$ ion concentration in the wastewater. Also shown in the case of runs 4 to 7, is the amount of $Ca(OH)_2$ added to the solution, and the final pH of the solution.

Summary of Sulfamic Acid Denitrification Runs

| Parameters | Examples (Runs) 1 | 2 | 3 | 4 | 5 | 6 | 7 |
|---|---|---|---|---|---|---|---|
| Initial $NO_2$, mg/l | 3820 | 3820 | 3820 | 3820 | 1200 | 900 | 900 |
| Sulfamic Acid, g | 12 | 8.5 | 9.5 | 9.5 | 2.5 | 1.43 | 1.43 |
| End pH | 1.02 | 1.70 | 1.75 | 1.68 | 1.8 | 2.1 | 2.0 |
| Final $NO_2$, mg/l | 0 | 0 | 0 | 0 | 0 | 0 | 0 |
| Molar Ratio (acid/$NO_2$) | 1.4 | 1.0 | 1.13 | 1.17 | 1.0 | 1.3 | 1.3 |
| $Ca(OH)_2$, g Added | — | — | — | 1.8 | 1.22 | 0.47 | 0.55 |
| Final pH | — | — | — | 7.7 | 7.0 | 7.0 | 7.7 |

It will be noted from the above table that in each run the final solution has no $NO_2$ even when the molar ratio of sulfamic acid to $NO_2$ was 1.0 (stoichiometric proportions of sulfamic acid to sodium nitrite), as in the case of runs 2 and 5.

EXAMPLES 8 and 9

A wastewater of the composition noted in Example 1 can also contain heavy metal ions of the metals Cd, Cu, Cr, Fe, Ni, Pb and Zn, in varying concentrations as noted in Table 2 below. Following removal of sodium nitrite from the wastewater in the manner disclosed in Example 1 (Run 1), sodium hydroxide,NaOH, is added to a sample of the wastewater in an amount such as to raise the pH of the solution to about 10. This results in precipitation of the heavy metal ions. The precipitates, suspended solids and sludge are removed from the solution by settling and filtration, and the resulting solution is analyzed for the remaining final concentration of the metal ions in the solution.

A similar procedure is carried out on another sample of the same wastewater following nitrite removal, except employing calcium hydroxide, $Ca(OH)_2$, in place of sodium hydroxide.

The data and results for such metal removal from the wastewater by chemical precipitation are set forth in Table 2 below:

TABLE 2

Metal removal by chemical precipitation

| | | Examples (Runs) | |
|---|---|---|---|
| | | 8 | 9 |
| Metal | Initial Conc. (mg/l) | NaOH treatment Final Conc. | $Ca(OH)_2$ treatment (mg/l) |
| Cd | 0.041 | <0.005 | 0.023 |
| Cu | 43.6 | 0.16 | 0.18 |
| Cr | 0.05 | <0.02 | <0.02 |
| Fe | 39.5 | <0.02 | <0.02 |
| Ni | 1.76 | 0.17 | 0.31 |
| Pb | 3.52 | <0.05 | 0.06 |
| Zn | 2.11 | <0.04 | 0.03 |

It is seen from Table 2 above that substantial proportions of the metal ions in the wastewater are removed by the sodium hydroxide and calcium hydroxide treatments noted above. Thus, for example, lead, Pb, concentration is lowered to less than 0.05 mg/l, from an initial concentration of about 3.5 mg/l, by NaOH treatment. Cu and Fe concentrations are reduced from 43.6 mg/l and 39.5 mg/l, to 0.16 and less than 0.02 mg/l, respectively, by NaOH treatment. Similar results are obtained by $Ca(OH)_2$ treatment.

From the foregoing, it is seen that the invention provides a simple efficient integrated process for treatment of wastewater from steam boiler cleaning operations for (1) destruction of sodium nitrite by treatment with relatively small amounts of sulfamic acid, and (2) removal of heavy metal ions, (3) removal of suspended solids and (4) reduction of sludge from the wastewater following destruction of sodium nitrite. The result is that the so treated wastewater is rendered non-hazardous and can be sewered. The integrated process of the present invention is also highly cost effective.

Since various changes and modifications can be made in the invention without departing from the spirit of the invention, the invention is not to be taken as limited except by the scope of the appended claims.

What is claimed is:

1. A process for treatment of wastewater from steam boiler cleaning operations, said wastewater containing sodium nitrite, which comprises adding sulfamic acid to said wastewater in a proportion of 1 to about 1.4 moles per mole of sodium nitrite and converting substantially all of the nitrite ion to nitrogen.

2. The process of claim 1, using substantially stoichiometric proportions of sulfamic acid with respect to sodium nitrite.

3. An integrated process for treating wastewater from steam boiler cleaning operations, said wastewater containing sodium nitrite, heavy metal ions, suspended solids, and sludge, which comprises adding sulfamic acid to said wastewater in substantially stoichiometric proportions with respect to sodium nitrite, converting substantially all of the nitrite ion from the sodium nitrite into nitrogen while maintaining the reaction mixture at a pH ranging from about 1.5 to about 4, the reaction taking place at ambient temperature and at atmospheric pressure, adding sodium hydroxide or calcium hydroxide to the resulting treated wastewater in an amount sufficient to raise the pH of the solution to about 10, and precipitating said metal ions as insoluble hydroxides, and removing said insoluble hydroxides, said suspended solids and said sludge from the treated wastewater.

4. The process of claim 2, and after the reaction is completed for converting nitrite ion to nitrogen, adding alkali to the resulting solution in an amount sufficient to raise the pH of the wastewater to approximately 7, to permit sewer discharge of the treated wastewater.

5. The process of claim 2, said wastewater also containing heavy metal ions capable of forming insoluble hydroxides, and after the reaction is completed for converting nitrite ion to nitrogen, adding an alkali to the resulting solution in an amount sufficient to raise the pH of the solution to about 9 to 10, and precipitating said metal ions.

6. The process of claim 5, wherein said alkali is selected from the group consisting of alkali metal hydroxide and alkaline earth metal hydroxides.

7. The process of claim 5, wherein said alkali is sodium hydroxide or calcium hydroxide.

8. The process of claim 5, said wastewater also containing suspended solids, and including removing the precipitated heavy metal ions and said suspended solids from the treated wastewater.

9. The process of claim 3, said removing said insoluble hydroxides and said suspended solids including settling said insoluble hydroxides, said suspended solids and said sludge in the treated wastewater, filtering the resulting mixture and discharging the resulting final treated wastewater to sewer.

10. The process of claim 3 wherein said metal ions are selected from the group consisting of Cu, Fe, Pb, Cr, Cd, Zn and Ni ions.

* * * * *